(12) United States Patent
Filatov et al.

(10) Patent No.: US 8,311,296 B2
(45) Date of Patent: Nov. 13, 2012

(54) VOTING IN MAMMOGRAPHY PROCESSING

(75) Inventors: Alexander Filatov, Longmont, CO (US); Vadim Nikitin, Boulder, CO (US)

(73) Assignee: Parascript, LLC, Boulder, CO (US)

( * ) Notice: Subject to any disclaimer, the term of this patent is extended or adjusted under 35 U.S.C. 154(b) by 1160 days.

(21) Appl. No.: 11/943,957

(22) Filed: Nov. 21, 2007

(65) Prior Publication Data

US 2009/0129656 A1    May 21, 2009

(51) Int. Cl.
*G06K 9/62* (2006.01)
(52) U.S. Cl. .................. 382/128; 382/132; 382/224
(58) Field of Classification Search .................. 382/128
See application file for complete search history.

(56) References Cited

U.S. PATENT DOCUMENTS

| | | | |
|---|---|---|---|
| 6,669,482 B1 * | 12/2003 | Shile | 434/262 |
| 6,694,059 B1 * | 2/2004 | Zlotnick | 382/228 |
| 7,783,089 B2 * | 8/2010 | Kaufhold et al. | 382/128 |
| 8,223,143 B2 * | 7/2012 | Dastmalchi et al. | 345/418 |
| 2010/0202674 A1 | 8/2010 | Filatov et al. | |

OTHER PUBLICATIONS

Angelini, Enrico et al., "A Ranklet-Based CAD for Digital Mammography", Proceedings of the 8th International Workshop on Digital Mammography, pp. 340-346 (2006).

Bruynooghe, Michel, "Mammographic Mass Detection Using Unsupervised Clustering in Synergy with a Parcimonious Supervised Rule-Based Classifier", Lecture Notes in Computer Science, vol. 4046/2006, pp. 68-75 (Sep. 29, 2006).

Fung, Glenn, "Addressing Image Variability While Learning Classifiers for Detecting Clusters of Micro Calcifications", Digital Mammography/IWDM, pp. 84-91 (2006).

* cited by examiner

*Primary Examiner* — Phillip A Johnston
(74) *Attorney, Agent, or Firm* — Merchant & Gould, P.C.

(57) ABSTRACT

Methods and systems are disclosed to aid in the detection of areas of interest in an image. Multiple image recognition processes analyze the image and identify areas of interest. The identified areas of interest are compared to determine confidence values for each identified area of interest using a voting process. The confidence values may be used in determining areas of increased interest which are highlighted on the image. In embodiments, identified areas of interest meeting a certain threshold requirement are selected as areas of increased interest. In other embodiments, new areas of increased interest are created by combining areas of interest. Embodiments of the disclosed methods and system may be used to aid in the detection of cancer in mammogram images.

21 Claims, 9 Drawing Sheets

VOTING IN MAMMOGRAPHY PROCESSING

BACKGROUND

Medical imaging has been utilized in the medical industry for various purposes from detecting broken or fractured bones to identifying the early development of cancer. Medical images are generally analyzed by experts such as radiologists or physicians in order to determine whether the image displays an indication that the patient requires medical treatment. However, many radiologists and physicians analyze hundreds of medical images a day leading to fatigue which may result in human error. Computer applications may be used to mitigate the chance of human error. It is with respect to this general environment that embodiments of the present invention have been contemplated.

SUMMARY

Embodiments of the present disclosure relate to detecting areas of interest on an image. In embodiments, one or more image recognition processes are applied to an image to locate areas of interest on the image. In embodiments, each image recognition process is unique (e.g. each is process uses a different algorithm, has a different threshold values, etc.). In one embodiment, the recognition processes do not share the information generated by the process (e.g., information derived from computations, results, etc.). In some embodiments, each image recognition process identifies one or more areas of interest on the image. In embodiments, a process may also calculate a confidence value for each area of interest that corresponds to the likelihood that an image recognition process properly identified an area of interest. After identifying the areas of interest, in which the locations are identified by the different recognition processes, the areas are compared. In an embodiment, the areas are compared using a voting process. The voting process may calculate a refined confidence value that corresponds to the likelihood that an image recognition process properly identified an area of interest provided that other image recognition processes identified a set of areas of interest that may be accompanied by corresponding confidence values. In further embodiments, the voting process may select specific identified areas of interest calculated by one or more image recognition processes, identify new areas of interest based upon the identified areas of interest calculated by the one or more image recognition processes, or both.

In embodiments, the resulting areas of interest identify the location of cancer in a mammogram image. In other embodiments, the methods and systems disclosed herein are used to detect lesions, calcifications, tumors, cysts, or other ailments, each of which terms are used interchangeably herein. In embodiments, the areas of interest are identified on the image for further review by a physician. In other embodiments, information about the identified areas of interest is passed to other applications for further processing. While certain methods and systems disclosed herein may be directed towards detecting cancer in mammogram images, one skilled in the art will recognize that the methods and systems may also be practiced on other types of X-ray images, computer axial tomography ("CAT") scans, magnetic resonance imaging ("MRI's"), or any other type of medical imaging known in the art. In further embodiments, the methods and systems disclosed herein may be applied to images of any organ or tissue to aid in pathology.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Embodiments of the present invention may be more readily described by reference to the accompanying drawings in which like numbers refer to like items and in which.

DETAILED DESCRIPTION

Figure 1:
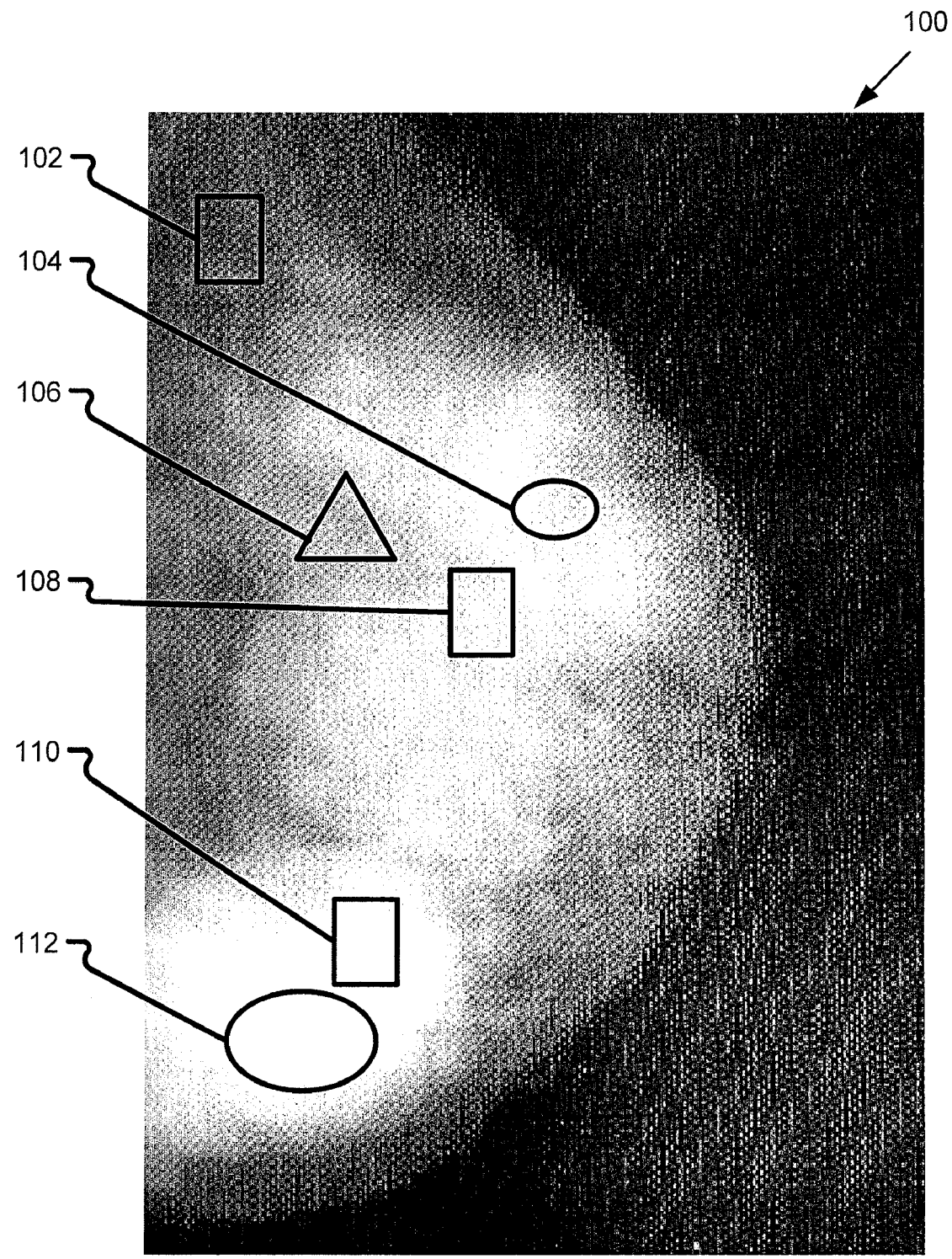
FIG. 1 is an illustration of a mammogram image 100 displaying identified areas of interest.

This disclosure will now more fully describe exemplary embodiments with reference to the accompanying drawings, in which some of the possible embodiments are shown. Other aspects, however, may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present disclosure relate to detecting areas of interest in an image. In embodiments, one or more image recognition processes are applied to an image to locate areas of interest on the image. In embodiments, each image recognition process is unique (e.g. each process uses a different algorithm, has a different threshold values, etc.). In one embodiment, the recognition processes do not share the information generated by the process (e.g., information derived from computations, results, etc.). In embodiments, each image recognition process may identify one or more areas of interest on the image. A process may also calculate a confidence value for each area of interest that corresponds to the likelihood that an image recognition process properly identified an area of interest. After identifying the areas of interest, the locations identified by the different algorithms, the resulting areas are compared. In an embodiment, the areas are compared using a voting process. The voting process may calculate a refined confidence value that corresponds to the likelihood that an image recognition process properly identified an area of interest provided that other image recognition processes identified a set of areas of interest that may be accompanied by corresponding confidence values. In further embodiments, the voting process may select specific identified areas of interest calculated by one or more image recognition processes, identify new areas of interest based upon the identified areas of interest calculated by the one or more image recognition processes, or both.

In embodiments, the resulting areas of interest identify the location of cancer in a mammogram image. In other embodiments, the methods and systems disclosed herein are used to detect lesions, calcifications, tumors, cysts, or other ailments, each of which terms are used interchangeably herein. In embodiments, the areas of interest are identified on the image for further review by a physician. In other embodiments, information about the identified areas of interest is passed to other applications for further processing. While certain methods and systems disclosed herein may be directed towards detecting cancer in mammogram images, one skilled in the art will recognize that the methods and systems may also be practiced on X-ray images, computer axial tomography ("CAT") scans, magnetic resonance imaging ("MRI's"), or any other type of medical imaging known in the art. In further embodiments, the methods and systems disclosed herein may be applied to images of any organ or tissue to aid in pathology.

Referring now to FIG. 1, an illustration of a mammogram image 100 displaying identified areas of interest is provided. In embodiments, the methods and systems disclosed herein receive an image, such as mammogram image 100, and apply one or more image identification processes. Image recognition processes may identify areas of interest on an image. Identified areas of interest may be displayed on the image, such as identifications 102, 104, 106, 108, 110, and 112. In embodiments, an image recognition process, such as a rule-based image analyzer or a probabilistic image analyzer, may identify areas of interest on an image by examining specific features of the image, although other image recognition processes may be employed in other embodiments of the present disclosure. Examined features may include image features such as intensity, gradient of intensity, contrast, location, or any other examinable image features known to the art. In other embodiments, image recognition processes may use an algorithm to identify areas of interest on the image (e.g., algorithms using pattern matching, statistical analysis, pattern recognition, etc.) One of skill in the art will appreciate that the disclosed methods and systems will operate regardless of the means employed by the image recognition processes, and that any type of image detection or analysis know to the art may be used.

In embodiments, an image will be processed by at least one image recognition process. In the example illustrated by FIG. 1, three different image recognition processes were used. For example, areas of interest identified by a rectangular border, such as identifications 102, 108, and 110, are areas of interest identified by a first image recognition process. Areas of interest identified by an oval border, such as identifications 104 and 112, may be identified by a second image recognition process, where the second image recognition process is different than the first image recognition process used to identify the areas of interest corresponding to identifications 102, 108, and 110. In embodiments, the areas of interest may be identified independently using different image recognition processes. In such an embodiment, the different image recognition process may not share information used in identifying the areas of interest. In other embodiments, the results of one image recognition process may be input into a second image recognition process. Identification 106, identified by a triangular border may be identified using yet another unique image recognition process. In embodiments, image recognition processes are unique when the processes utilize different means for identifying areas of interest on the image (e.g., examine different features, employ different algorithms, use different thresholds, etc.) Image recognition processes, in embodiments, may output results in the form of identified areas of interest, objects on the image, or nothing (e.g., no identified areas of interest). One of skill in the art will recognize that as long as there is at least one unique image recognition process, any number of additional image recognition processes can be used with the disclosed systems and methods.

Because image recognition processes are inherently imperfect, not every identified area of interest, e.g., identifications 102, 104, 106, 108, 110, and 112, are actual areas of interest. An identified area of interest that is not an actual area of interest is known as a false positive. False positives may be eliminated by determining a confidence value for each identified area of interest, such as identifications 102, 104, 106, 108, 110, and 112. In embodiments, a confidence value may be determined by comparing the identified areas of interest identified by one image recognition process with areas of interest recognized by a second image recognition process. For example, if one or more unique image recognition processes identify the same area, or overlapping areas, or areas closely located to one another, such as identification 110 and identification 112, as an area of interest on the image, there is a higher likelihood that an actual area of interest exists in that area. Thus, the identifications in this instance may be assigned a higher confidence value. Conversely, if an area of interest identified by one image recognition process is remotely located from other identified areas of interest, such as identification 102, it is more likely that the identified area of interest is a false positive (e.g., not an actual area of interest) because the image recognition process or other image recognition processes did not recognize the area as an area of interest. In this situation, a lower confidence value may be assigned to the identification. In embodiments, confidence values may be assigned to the individual identifications themselves or to areas representing a combination of the individual identifications (e.g., new areas of increased interest).

In other embodiments, the confidence value for an identified area of interest may also be determined or adjusted by comparing areas of interest identified by the same image recognition process. For example, identifications 102, 108, and 110, areas of interest identified by the same imager recognition process, may be compared. As a result of the comparison, confidence values for each of the identified areas of interest may be assigned or adjusted.

In embodiments, the comparisons are made using different areas of interest identified by different image recognition processes to determine the confidence value of areas of interest. This differs from using a single image recognition process to determine an area of interest and then re-analyzing the determined area of interest with different image recognition processes. Instead, in embodiments, the entire relevant portion of an image may be analyzed by different image recognition processes or a single image recognition process. In such an embodiment, the recognition process or processes may identify different areas of interest, or objects, on the image. In embodiments, the areas of interest may be identified independently or jointly using more than one image recognition process. In some instances, an image recognition process will not identify any areas of interest or objects on the image. The results of the image recognition process or processes (e.g., determined areas of interest, identified object, or the lack of identification) may then be compared to one another. As a result, comparing the identified areas, or objects, or lack thereof results in a determination of a confidence value for each object.

Figure 5:
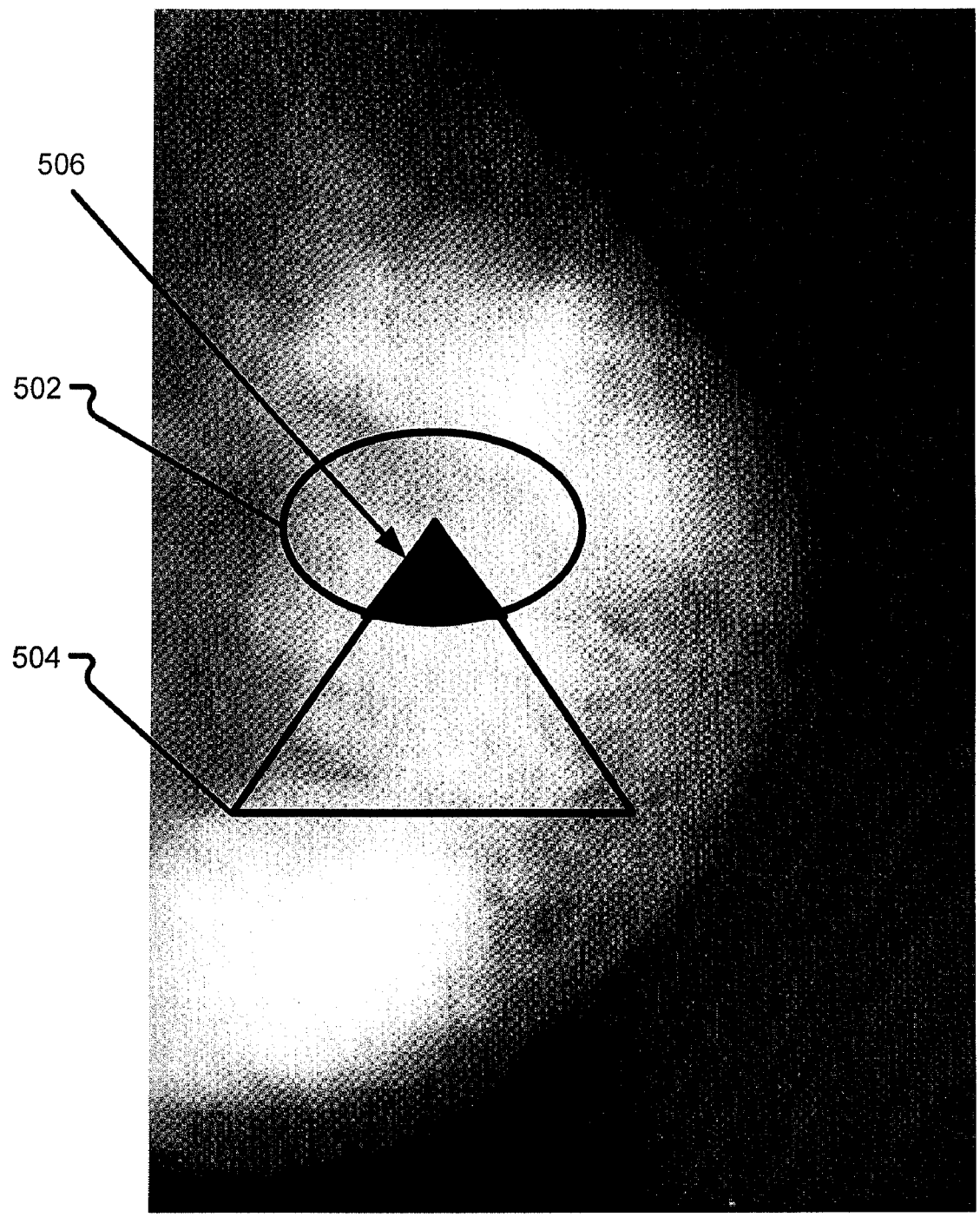
FIG. 5 is an illustration of a mammogram image 500 displaying a situation where sections of two different identified areas of interest overlap.

In embodiments, the accuracy of location of identified areas of interest on the image may also be augmented by comparing identified areas of interest identified by at one or more image recognition processes. For example, if two identified areas of interest overlap (See FIG. 5) the comparison may result in a new identified area of interest that contains only the overlapping portion of the two identified areas of interest, as demonstrated by overlapping portion 506 (FIG. 5). Because both areas of interest overlap, there is a higher likelihood that the overlapped area contains an actual area of interest as opposed to the portions of the two identified areas that do not overlap. Thus, the resulting identification identifying the overlapped portion 506 (FIG. 5) of the two identified areas of interest may represent a more accurate identification of an area of interest. In general, a new set of areas of interest may be created based on a set of original areas of interest identified by one or more image recognition processes. The new areas of interest may be determined by selecting the overlapping portions of original identified areas of interest, by combining the original identified areas of interest, or by creating more complex areas of interest based upon the original identified areas of interest. While embodiments of the present figure have been described using specific markings (e.g., oval, rectangle, and triangle boundaries), one of skill in the art will appreciate that any form of image labeling known to the art may be practiced with embodiments of the present disclosure.

Figure 2:
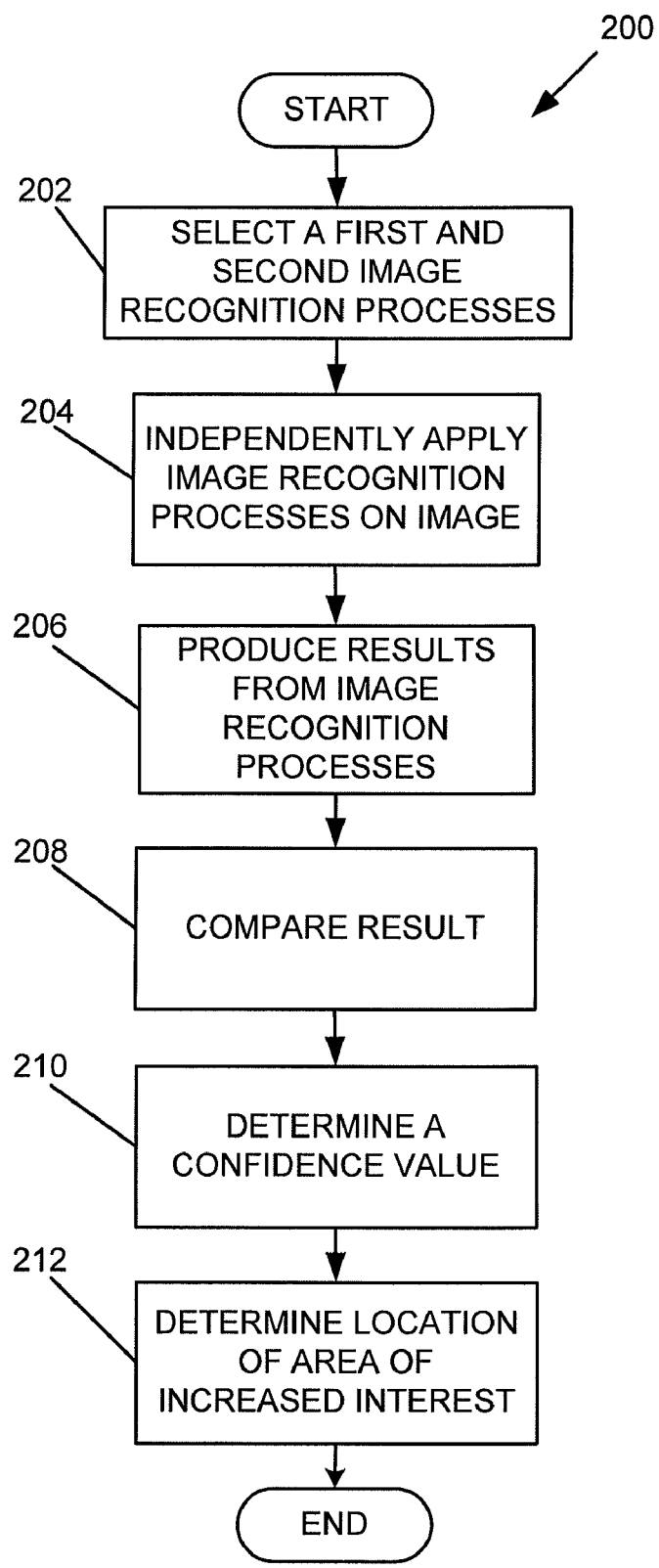
FIG. 2 is a flow chart representing an embodiment of a method 200 for determining a confidence value for and locations of areas of interest on an image.

FIG. 2 is a flow chart representing an embodiment of a method 200 for determining a confidence value for and locations of areas of interest on an image. In embodiments, flow begins at select operation 202 where first and second image recognition processes are selected by the method. In embodiments, the selected image recognition processes are unique. In another embodiment, the selected image recognition processes may be the same. Flow then proceeds to apply operation 204 where the selected image recognition processes are applied to an image. In one embodiment, the image recognition processes are applied independently such that no information is shared between the processes, thus allowing the processes to independently identify areas of interest on the image. In another embodiment the image recognition processes may share some information. In one embodiment, the image recognition processes are performed serially. In other embodiments, the image recognition processes are performed in parallel to save computing time. In such embodiments, a parallel processor system may be utilized to provide the computational power necessary to perform parallel image recognition processes. In embodiments, each processor of a parallel processor system is dedicated to each image recognition algorithm in order to spread the workload across multiple processors and increase computational efficiency. Other distributed and parallel computing processes will be recognized by those of skill in the art. Embodiments of computer systems operable to execute embodiments of the disclosure are explained below with regards to FIG. 9.

Flow may then proceed to produce operation 206. Produce operation 206 may produce indications of identified areas of interest produced by each image recognition process on the image. For example, FIG. 1 is an embodiment illustrating indications of various identified areas of interest produced by various image recognition processes. In some embodiments, produce operation 206 is not performed and/or the results of produce operation 206 are not presented to a user, but are used as inputs to compare operation 208.

Flow then proceeds to compare operation 208, where the results (e.g., the identified areas of interest or objects) of the first and second image recognition processes are compared. For example, the areas of interest or objects on the image identified by the one or more image recognition processes are compared. In embodiments, the comparison is accomplished using a voting process. Various embodiments of voting processes are further described below with reference to FIGS. 3-8. In embodiments, the results of the compare operation 208 are used in determining a confidence value in confidence operation 210 and/or in determining a location of areas of increased interest in location operation 212. In other embodiments, comparisons and/or voting may be used to produce a confidence value when a first image recognition process outputs an area of interest and a second image recognition process outputs nothing. For example, if a first image recognition process identifies one or more areas of interest on an image and a second image recognition process does not, the confidence values for the identified areas of interest may be adjusted accordingly to take into account the results, or lack thereof, of the second image analyzer.

Flow proceeds to confidence operation 210, where a confidence value is determined for the identified areas of interest. In embodiments, the confidence value is based upon the comparison or comparisons made in comparison operation 210. In embodiments, if an area of interest identified by the first image recognition process is collocated with, overlapping, or located near an area of interest identified by a second image recognition process, the identified areas may be assigned a higher confidence value, as previously described with reference to FIG. 1. Conversely, in embodiments, if an area of interest identified by the first or second image recognition processes is located remotely from other identified areas of interest, then the remote area of interest may be assigned a lower confidence value. Confidence values for new areas of interest (e.g., combined areas of interest identified by one or more image recognition processes, overlapping portions, etc.) may also be determined at operation 210.

In location operation 212, a determination is made as to the locations of identified areas of interest that most likely correspond to actual areas of interest. An actual area of interest is an area on the image that actually displays sought after features (e.g., cancer in a mammogram image). In embodiments, the determination is based upon the confidence value of each identified area of interest assigned in confidence operation 210. In one embodiment, only identified areas of interest meeting a certain threshold related to one or more confidence values are selected. These selected areas are areas of increased interest due to their confidence value meeting a required threshold. The threshold of confidence may be pre-defined, determined during the operation of method 200, or determined by a user. These areas of increased interest are selected because they are more likely to be actual areas of interest and less likely to be false positives. In this embodiment, only indications of areas of increased interest meeting the threshold of confidence are displayed on the image. In embodiments, indications of areas of increased interest may be displayed on the image by highlighting the areas of increased interest, enclosing the areas of increased interest in a border, marking the areas of increased interest, or by any other method of image labeling known in the art.

In another embodiment, location operation 212 may create new areas of increased interest based upon the comparisons made in compare operation 208. For example, if identified areas of interest overlap, location operation 212 may create a new areas of increased interest that corresponds only to the overlapping portion of the identified areas of interest. In this embodiment, indications of the new areas of increased interest are displayed on the image. In yet another embodiment, identified areas of interest meeting a threshold of confidence and new areas of increased interest produced at location operation 212 are displayed on the image. Although operations 208, 210, and 212 have been described as independent operations, one of skill in the art will appreciate that these operations may be accomplished in one step (e.g., the compare operation 208 may also assign confidence values and determine locations of areas of increased interest).

Figure 3:
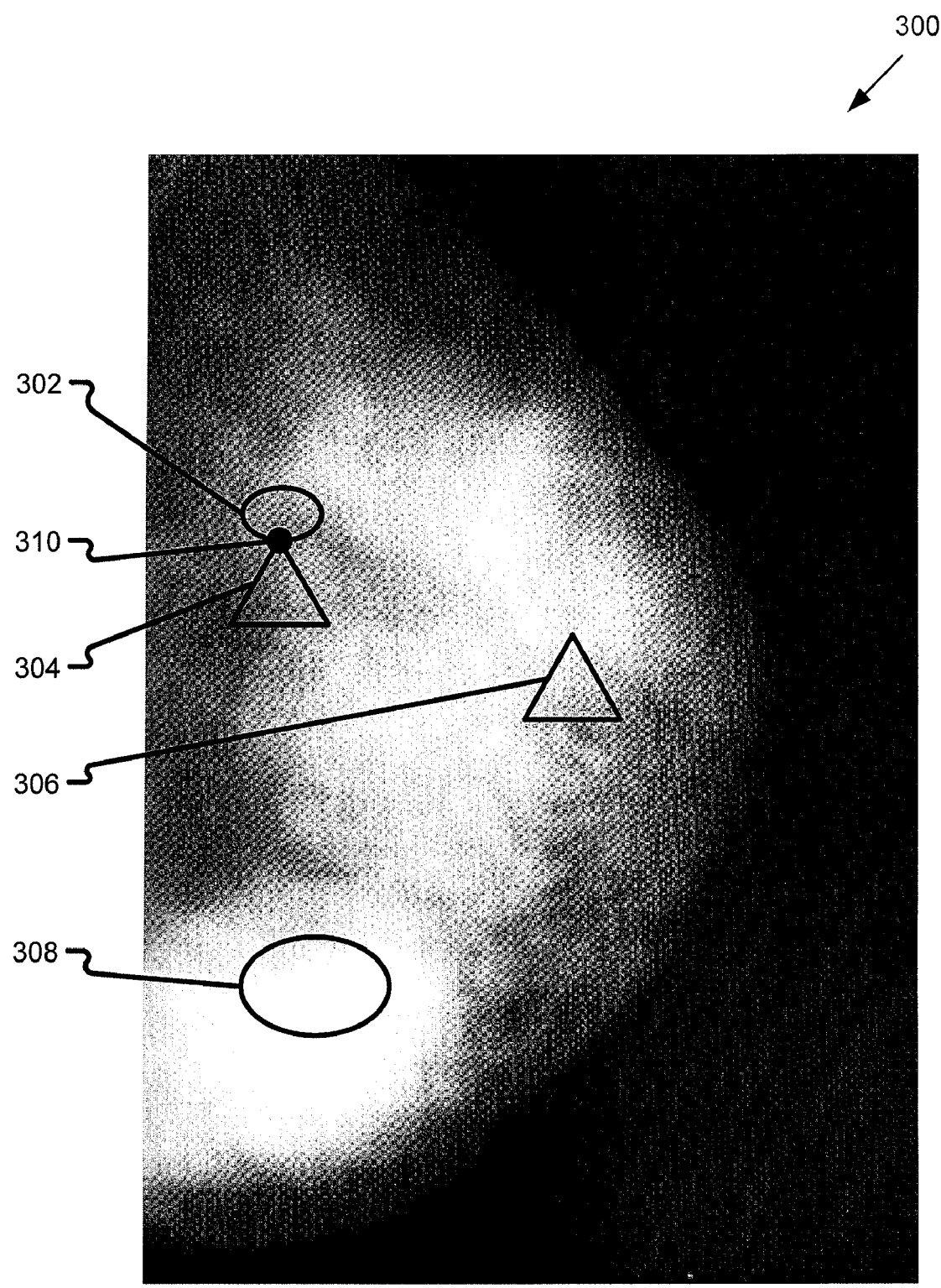
FIG. 3 is an illustration of a mammogram image 300 displaying a situation where the boundaries of different identified areas of interest intersect.

Referring now to FIG. 3, an illustration of a mammogram image 300 displaying a situation where the boundaries of different identified areas of interest intersect is provided. FIG. 3 displays areas of interest identified by two image recognition processes at identifications 302, 304, 306, and 308. In other embodiments, indications 302, 304, 306, and 308 may be identified by a single image recognition process or by more than two image recognition processes. A first image process identified two areas of interest, identifications 302 and 308 represented as ovals. A second image process identified an additional two areas of interest identifications 304 and 306 represented as triangles. In embodiments, identifications 302, 304, 306, and 308 may be identified by one or more image recognition processes or the identifications may be identified using a combination of image recognition processes. The borders of identifications 302 and 304 intersect, at intersection point 310. The intersection of the borders indicates a higher probability that an area of increased interest exists in the vicinity of the identified areas of interest 302 and 304 because two different image recognition processes identified the vicinity as an area of interest. In other embodiments, two identified areas of interest in the same vicinity may result in higher confidence values. Therefore, the identified areas of interest represented by identifications 302 and 304 may be assigned a higher confidence. In one embodiment, identified areas of interest represented by identifications 302 and 304 may be assigned a higher confidence. In another embodiment, the areas where identifications 302 and 304 intersect are assigned a higher confidence. In yet another embodiment, identifications 302 and 304 are assigned a higher confidence and a new area of increased interest around the intersection points is also assigned a higher confidence. In this embodiment, the confidence assigned to each of the areas may or may not be the same (e.g., the new area of increased interest may have a higher confidence than identifications 302 and 304). Conversely, indications 306 and 308 are located remotely from all other indications. In embodiments, indications 306 and 308 may be determined to be remote from other indications because their borders do not intersect the borders of other indications. Because these indications are remotely located, there is a higher likelihood that these indications represent false negatives, and therefore may be assigned lower confidence values. FIG. 3 is an embodiment in which the comparison performed in compare operation 208 (FIG. 2) may use a voting process that determines whether the boundaries of areas of interest intersect.

In another embodiment an automatic learning process based, for example, on statistical methods or neural networks is utilized to determine a confidence value for each area based on such features as a confidence value assigned by an image recognition process that identified the area, locations of areas identified by other recognition processes, corresponding confidence values, etc. In embodiments, the areas of interest, or objects, separately identified by different image recognition processes which analyze an entire image are compared to determine confidence levels. While embodiments of the present figure have been described using specific markings (e.g., oval and triangle boundaries), one of skill in the art will appreciate that any form of image labeling known to the art may be practiced with embodiments of the present disclosure. One of skill in the art will also appreciate that while embodiments of the present disclosure have been explained in regards to analyzing mammogram images, any type of image may be analyzed using embodiments of the present disclosure.

Figure 4:
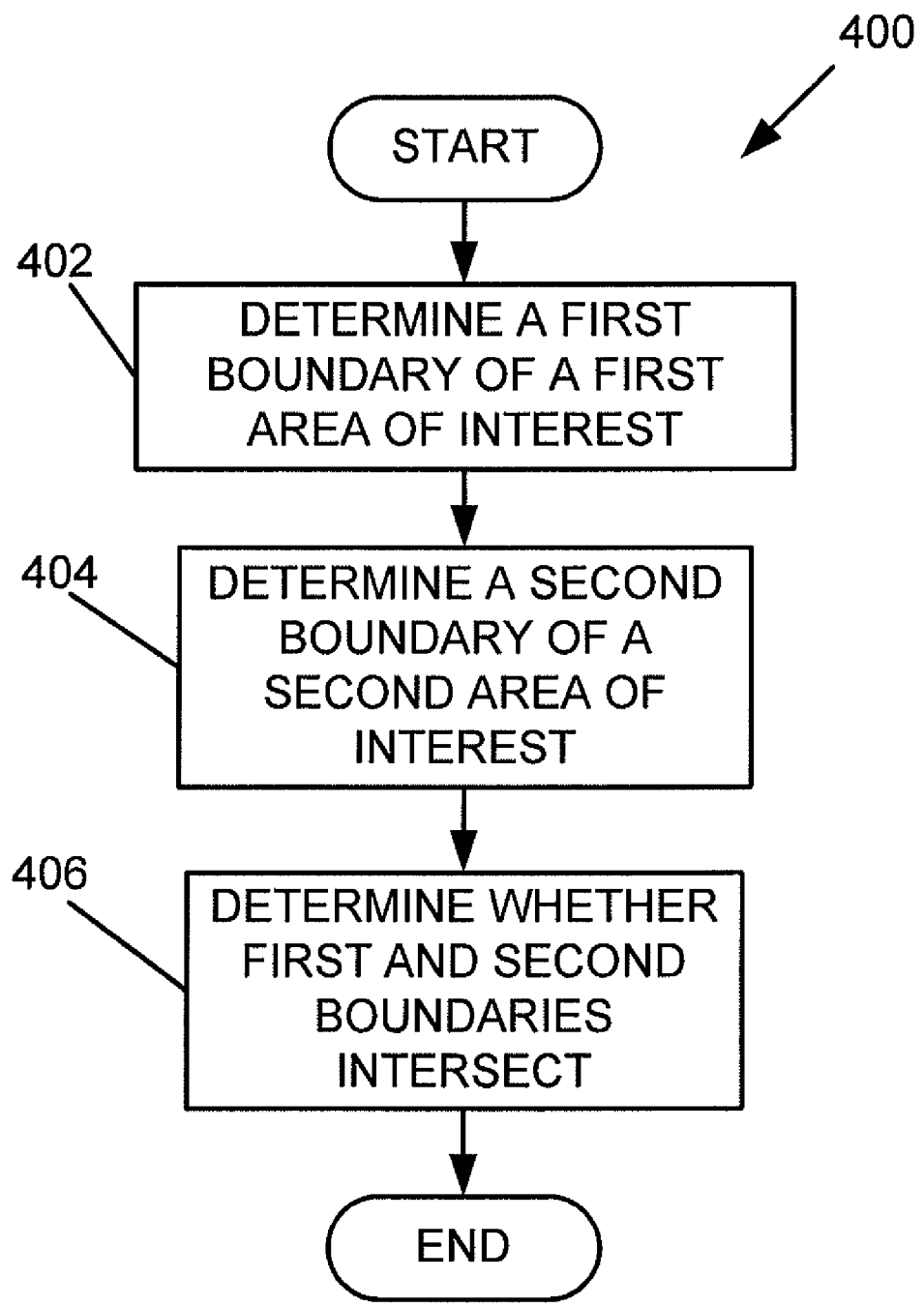
FIG. 4 is a flow chart representing an embodiment of a method 400 for applying a voting process based upon an intersection of boundaries of identified areas of interest.

FIG. 4 is a flow chart representing an embodiment of a method 400 for applying a voting process based upon an intersection of boundaries of identified areas of interest. Flow begins at operation 402, where the method determines a boundary for a first area of interest identified by a first image recognition process. In one embodiment, the boundary may be determined by maintaining a list of pixels on the image corresponding to the boundary of the first identified area of interest. In embodiments, the image may be divided into nodes rather than pixels. In this embodiment, the nodes representing the border of the identified area of interest are determined. In another embodiment, the boundary may be determined by defining a mathematical formula representing the boundary of the first identified area of interest. One skilled in the art will appreciate that any method of determining a boundary for an area of an image may be employed at operation 402.

Flow then proceeds to operation 404, where the method determines a boundary for a second area of interest identified by a second image recognition process. In embodiments, the second are of interest is identified by the second image recognition process. In another embodiment, the second are of interest is defined by the same image recognition process that identified the first area of interest. Again, in one embodiment, the boundary may be determined by maintaining a list of pixels on the image corresponding to the boundary of the second identified area of interest. In embodiments, the image may be divided into nodes rather than pixels. In this embodiment, the nodes representing the border of the identified area of interest are determined. In another embodiment, the boundary may be determined by defining a mathematical formula representing the boundary of the second identified area of interest. One skilled in the art will appreciate that any method of determining a boundary for an area of an image may be employed at operation 404.

Once the boundaries for both identified areas of interest have been determined, flow proceeds to operation 406, where the method computes the intersection of the first and second boundaries. In one embodiment, the determination may be made by comparing the pixels representing the first boundary to the pixels representing the second boundary. If the same pixel is present in both boundaries, the borders intersect. In another embodiment, an intersection may be mathematically computed using mathematical representations of the first and second borders. One of skill in the art will appreciate that any method of determining the intersection boundaries may be employed with the disclosed methods and systems. In embodiments, steps 402, 404, and 406 are repeated until the boundary for every area of interest identified by the first image recognition process is tested to see if it intersects with at least one of the boundaries of every area of interest identified by the second image recognition process. While the present embodiments have been described with respect to two image recognition processes, one skilled in the art will appreciate that one or more image recognition processes may be employed by the disclosed embodiments. In embodiments with more than two image recognition processes, steps 402, 404, and 406 are repeated until every boundary of areas of interest identified by each image recognition process are compared to each boundary of areas of interest identified by the other image recognition processes.

In embodiments, results from the voting process of method 400 may be used in confidence operation 210 (FIG. 2). For example, if method 400 determines that the boundaries of areas of interest identified by different image recognition processes intersect, the areas of interest whose boundaries intersect are assigned a higher confidence value. In further embodiments, results from the voting process of method 400 may also be used in location operation 210 (FIG. 2). For example, indications of areas of identified interest that intersect may be displayed on the image, or operation 210 (FIG. 2) may create a new area of increased interest that corresponds to the area located between the intersections determined by method 400.

FIG. 5 is an illustration of a mammogram image 500 displaying a situation where sections of two identified areas of interest overlap. FIG. 5 displays areas of interest identified (identifications 502 and 504) by two image recognition processes. Identification 502 represents an area of interest identified by a first image recognition process, as indicated by the oval boundary. Identification 504 represents an area of interest identified by a second image recognition process, as indicated by the triangle boundary. In embodiments, identifications 502 and 504 may be identified by the same image recognition process. Identifications 502 and 504 overlap, as indicated by overlapping portion 506. Because the indications overlap, there is a higher likelihood that an actual area of interest exists within the vicinity of identifications 502 and 504. For example, because overlapping portion 506 was identified as an area of interest by both the first and second image recognition processes, there is a higher probability that an actual area of interest exists at overlapping portion 506. In this embodiment, a higher confidence value should be assigned to identifications 502 and 504. In another embodiment, a higher confidence value is assigned to overlapping portion 506. In yet another embodiment, higher confidence values are assigned both to identifications 502 and 504 and overlapping portion 506. In this embodiment, the confidence assigned to each of the areas may or may not be the same (e.g., the new area of increased interest at the overlapping portion 506 may have a higher confidence than identifications 502 and 504). While embodiments of the present figure have been described using specific markings (e.g., oval and triangle boundaries), one of skill in the art will appreciate that any form of image labeling known to the art may be practiced with embodiments of the present disclosure. One of skill in the art will also appreciate that while embodiments of the present disclosure have been explained in regards to analyzing mammogram images, any type of image may be analyzed using embodiments of the present disclosure.

Figure 6:
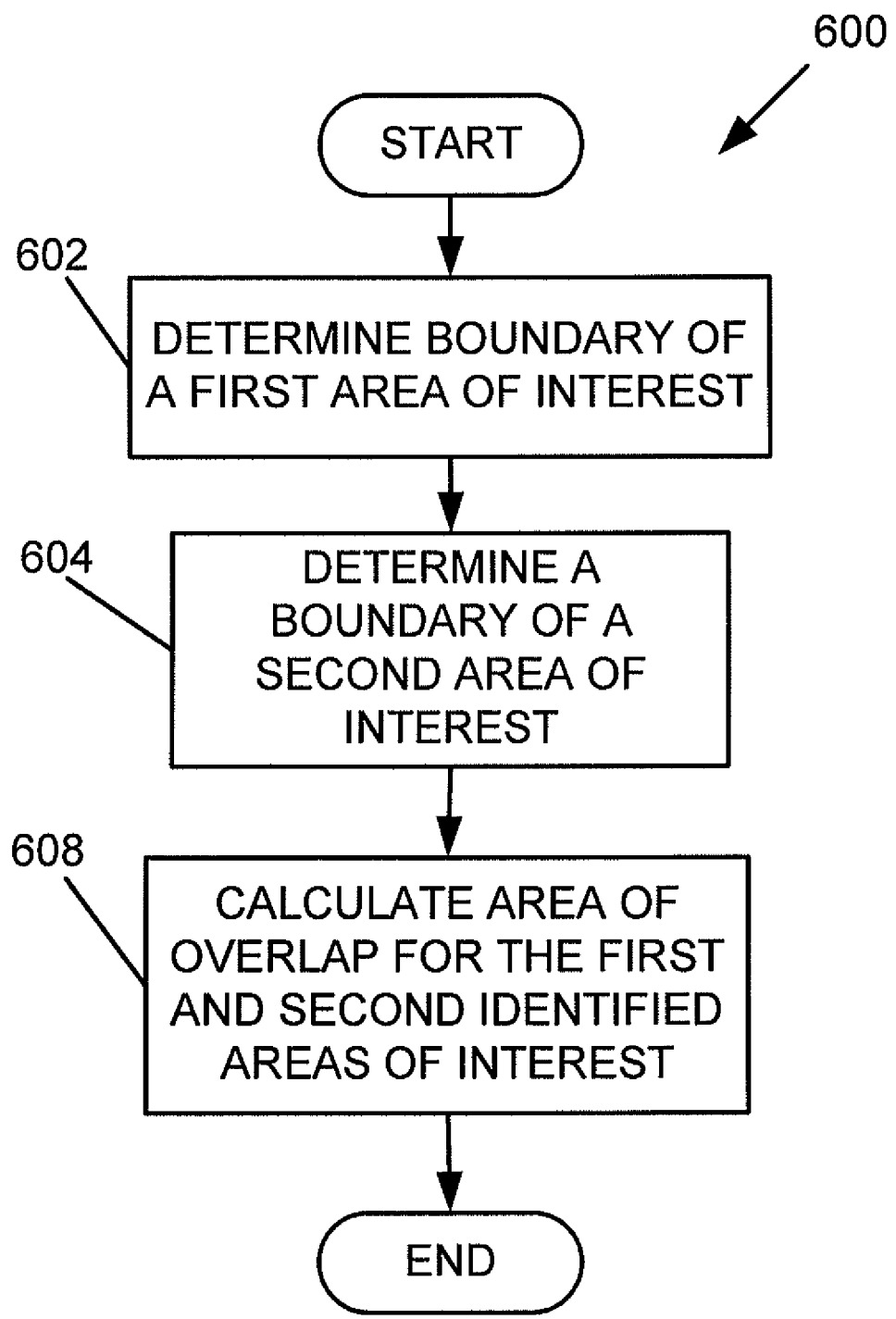
FIG. 6 is a flow chart representing an embodiment of a method 600 for applying a voting process based upon an overlap of different identified areas of interest.

FIG. 6 is a flow chart representing an embodiment of a method 600 for applying a voting process based upon an overlap of different identified areas of interest. Flow begins at operation 602, where the method determines a boundary for a first area of interest identified by a first image recognition process. In an embodiment, the method may also determine the group of pixels representing the interior section of the area of interest as well. In one embodiment, the boundary may be determined by maintaining a list of pixels on the image corresponding to the boundary of the first identified area of interest. In embodiments, the image may be divided into nodes rather than pixels. In this embodiment, the nodes representing the identified area of interest are determined. In another embodiment, the boundary may be determined by defining a mathematical formula representing the boundary of the first identified area of interest. One skilled in the art will appreciate that any method of determining a boundary for an area of an image may be employed at operation 602.

Flow then proceeds to operation 604, where the method determines a boundary for a second identified area of interest identified by a second image recognition process. In embodiments, the second identified area of interest is identified by the second image recognition process. In another embodiment, the second identified area of interest may be identified by the image recognition process that identified the first image recognition process. Again, in one embodiment, the boundary may be determined by maintaining a list of pixels on the image corresponding to the boundary of the second identified area of interest. In an embodiment, the method may also determine the group of pixels representing the interior section of the identified area of interest as well. In embodiments, the image may be divided into nodes rather than pixels. In this embodiment, the nodes representing the area of interest may be predetermined by the initial division of the image. In another embodiment, the boundary may be determined by defining a mathematical formula representing the boundary of the second identified area of interest. One skilled in the art will appreciate that any method of determining a boundary for an area of an image may be employed at operation 604.

Once the boundaries for both areas of interest have been determined, flow proceeds to operation 606, where the method computes the intersection of the first and second identified areas of interest. In one embodiment, the determination may be made by comparing the pixels representing the first identified area of interest to the pixels representing the second identified area of interest. If the same pixel is present in both areas, the areas overlap. In another embodiment, an overlapping area, if present, may be mathematically computed using mathematical representations of the first and second borders. One of skill in the art will appreciate that any method of determining overlapping areas may be employed with the disclosed methods and systems. In embodiments, steps 602, 604, and 606 are repeated until every area of interest identified by the first image recognition process is tested to see if it overlaps with at least one of the boundaries of every area of interest identified by the second image recognition process. While the present embodiments have been described with respect to two image recognition processes, one skilled in the art will appreciate that one or more image recognition processes may be employed by the disclosed embodiments. In embodiments with more than two image recognition processes, steps 602, 604, and 606 are repeated until every area of interest identified by each image recognition process is compared to each area of interest identified by the other image recognition processes to test for overlap.

In embodiments, results from the voting process of method 600 may be used in confidence operation 210 (FIG. 2). For example, if method 600 determines that the areas of interest identified by different image recognition processes overlap, the areas of interest that overlap are assigned a higher confidence value. In further embodiments, results from the voting process of method 600 may also be used in location operation 210 (FIG. 2). For example, indications of areas of interest that intersect may be displayed on the image, or operation 210 (FIG. 2) may create a new area of interest that corresponds to the overlapping areas determined by method 600.

In embodiments, areas of interest may be compared by measuring differences in relative locations. In such embodiments, different measurements of relative locations may be employed (e.g., closest point on the area of interest, furthest point, a focal point as discussed further in regards to FIGS. 7 and 8, etc.)

Figure 7:
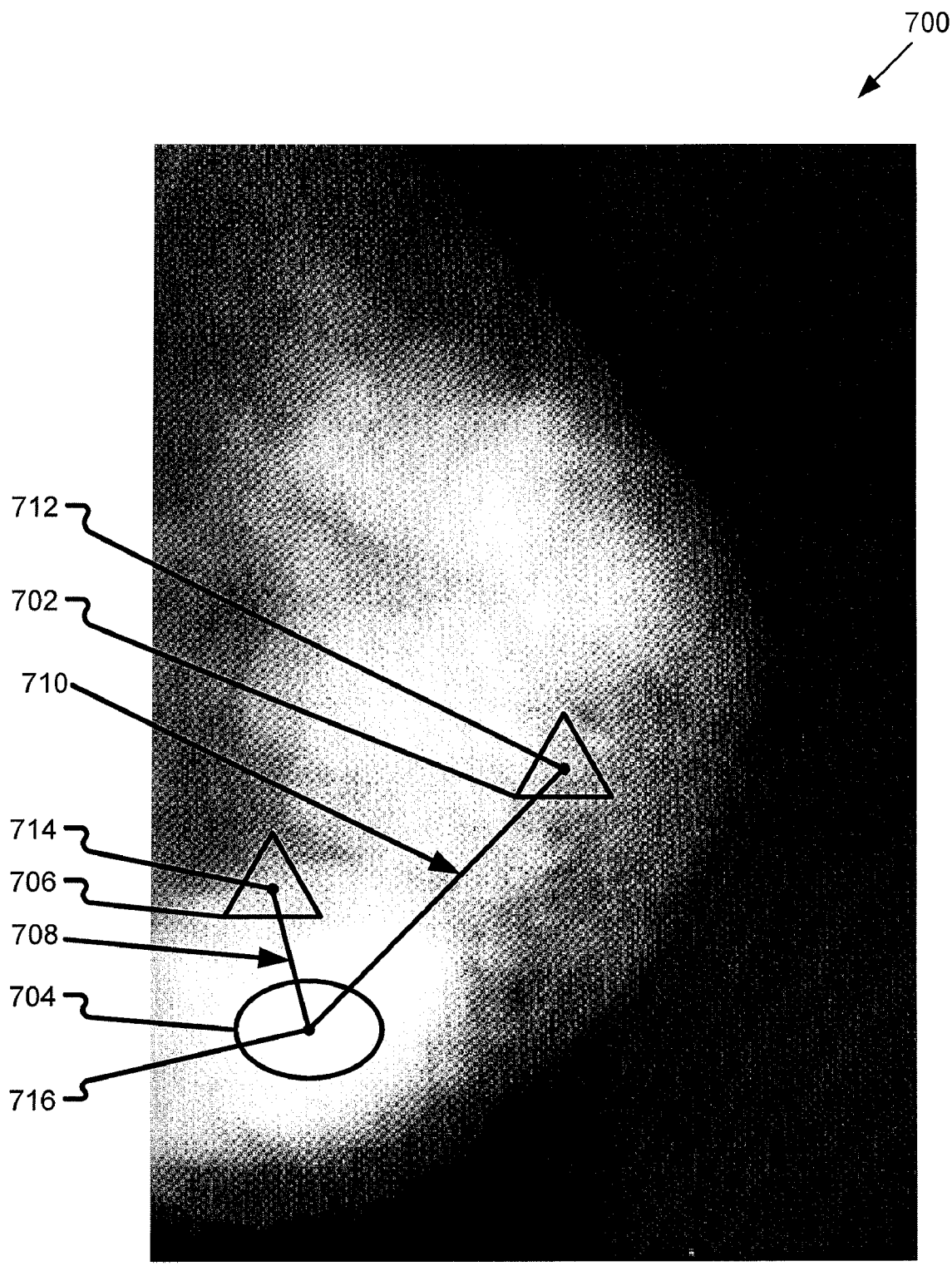
FIG. 7 is an illustration of a mammogram image 700 displaying a situation where the focal points of different identified areas of interest are compared.

FIG. 7 is an illustration of a mammogram image 700 displaying an embodiment where the focal points of different identified areas of interest are compared. FIG. 7 displays areas of interest identified by two image recognition processes, identifications 702, 704, and 706. Identifications 702 and 706 represent areas of interest identified by a first image recognition process, as indicated by the triangle boundary. Identification 704 represents an area of interest identified by a second image recognition process, as indicated by the oval boundary. In another embodiment, identification 704 may also be identified by the first image recognition process. In embodiments, each area of interest acknowledged by identifications 702, 704, and 706 have a focal point, e.g., focal points 712, 714, and 716. In embodiments, focal points may be the center of an area of interest. In other embodiments, focal points may be the point within an area of interest demonstrating the most interesting features or characteristics, or any other type of focal point known to the art. In embodiments, the distance between focal points may be used in determining a confidence value to assign to an area of interest. For example, a smaller the distance between focal points of two identified areas of interest may correlate to a higher confidence that the identified areas of interest correspond to actual areas of interest. This correlation is based upon the fact that two areas of interest are within a small locality. For example, the distance between the focal point 716 of identification 704 and the focal point 714 of identification 706, represented by connection 708, is relatively small. In one embodiment, identifications 704 and 706 are assigned higher confidence values because of the small distance between their respective focal points. Conversely the distance between the focal point 712 of identification 702 and the focal point 716 of identification 704, represented by connection 710, is relatively large. In embodiments, identifications 702 and 704 are assigned lower confidence values because of the large distance between their respective focal points. While embodiments of the present figure have been described using specific markings (e.g., oval and triangle boundaries), one of skill in the art will appreciate that any form of image labeling known to the art may be practiced with embodiments of the present disclosure. One of skill in the art will also appreciate that while embodiments of the present disclosure have been explained in regards to analyzing mammogram image, any type of image may be analyzed using embodiments of the present disclosure.

Figure 8:
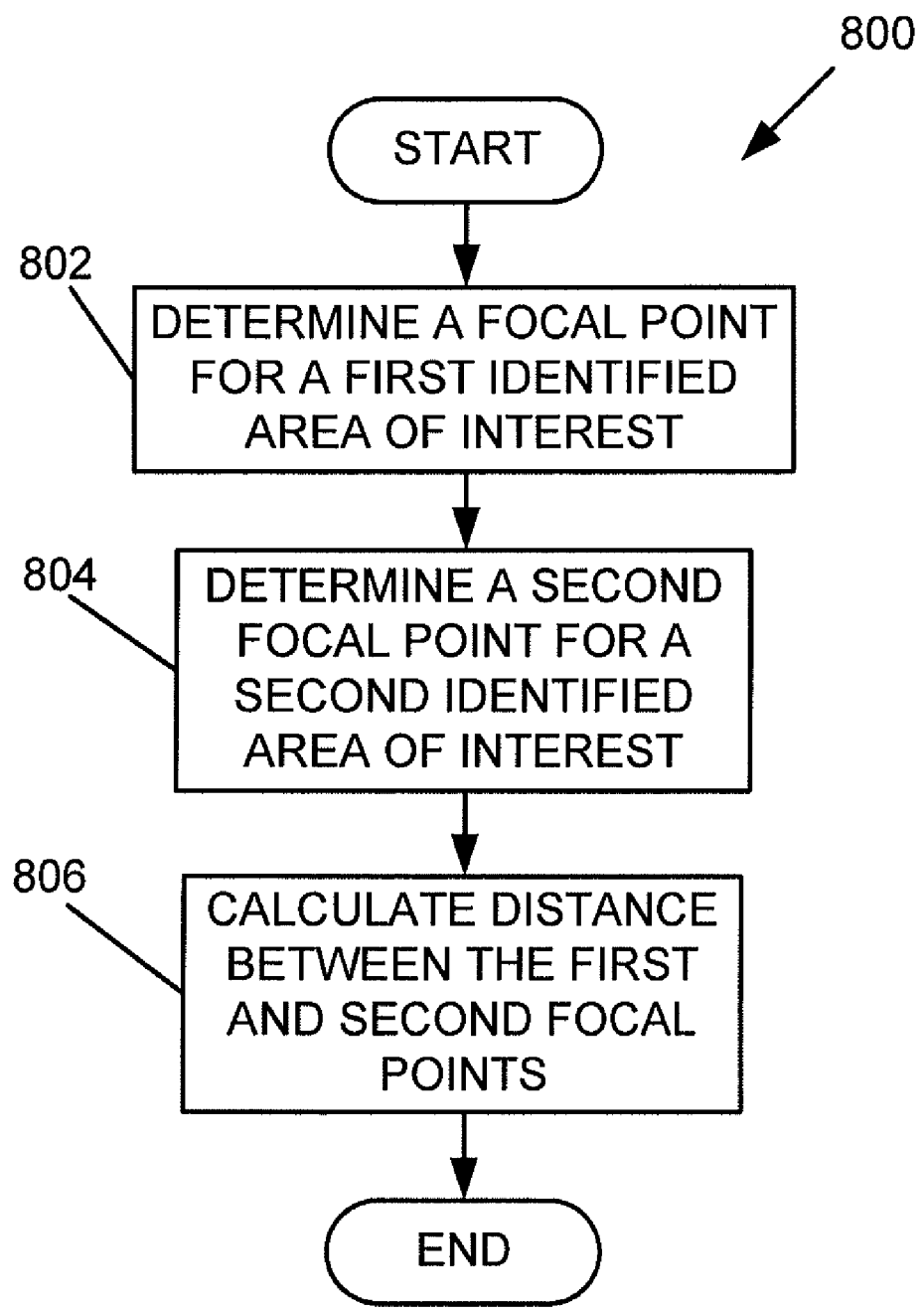
FIG. 8 is a flow chart representing an embodiment of a method 800 for applying a voting process based upon the comparison of focal points of different identified areas of interest.

FIG. 8 is a flow chart representing an embodiment of a method 800 for applying a voting process based upon the comparison of focal points of different identified areas of interest. Flow begins at operation 802 where a focal point is determined for a first area of interest identified by a first image recognition process. In one embodiment, the focal point is determined using mathematical formulas for calculating the center point of an area. In another embodiment, the focal point is previously determined. In such embodiments, operation 802 gathers information related to the previously determined focal point. In yet another embodiment, the focal point may be determined by the first image recognition process, e.g., by identifying a higher concentration of interest within the area, by placing markers within the area of interest, or by any other means of identifying a focal point known in the art. In these embodiments, operation 802 again performs the task of gathering information related to the identified focal point.

Flow proceeds to operation 804 where a focal point is determined for a second area of interest identified by a second image recognition process. The second area of interest, in embodiments, is identified by the second image recognition process. In another embodiment, the second area of interest may be identified by the first image recognition process. In one embodiment, the focal point is determined using mathematical formulas for calculating the center point of an area. In another embodiment, the focal point is previously determined. In such embodiments, operation 804 gathers information related to the previously determined focal point. In yet another embodiment, the focal point may be determined by the second image recognition process or by another process, e.g., by identifying a higher concentration of interest within the area, by placing markers within the area of interest, or by any other means of identifying a focal point known in the art. In these embodiments, operation 804 again performs the task of gathering information related to the identified focal point.

After determining the focal points for the areas of interest, flow proceeds to operation 806, where the method 800 calculates the distance between the focal points. In one embodiment, the calculation may comprise counting the number of pixels or nodes along a straight line (e.g., connections 708 and 710) separating the focal points. In another embodiment the distance between the two focal points may be mathematically computed using known mathematical algorithms. One of skill in the art will appreciate that any method of calculating the distance between two points on a plane may be employed with the methods and systems disclosed herein. In embodiments, steps 802, 804, and 806 are repeated until the distances between the focal point(s) of every area of interest identified by the image recognition process and the focal point(s) of every area of interest identified by the second image recognition process have been calculated. While the present embodiments have been described with respect to two image recognition processes, one skilled in the art will appreciate that one or more image recognition processes may be employed by the disclosed embodiments. In embodiments with more than two image recognition processes, steps 802, 804, and 806 are repeated until the distance between the focal point(s) of every area of interest or identified object on the image identified by each image recognition process and the focal point(s) of each areas of interest or identified object identified by the other image recognition processes have been calculated.

While embodiments of the present disclosure have been described with reference to specific voting processes described with reference to FIGS. 3-8, one skilled in the art will appreciate that any voting process that compares the areas of interest identified by image recognition processes may be employed with embodiments of the systems and methods disclosed herein.

Figure 9:
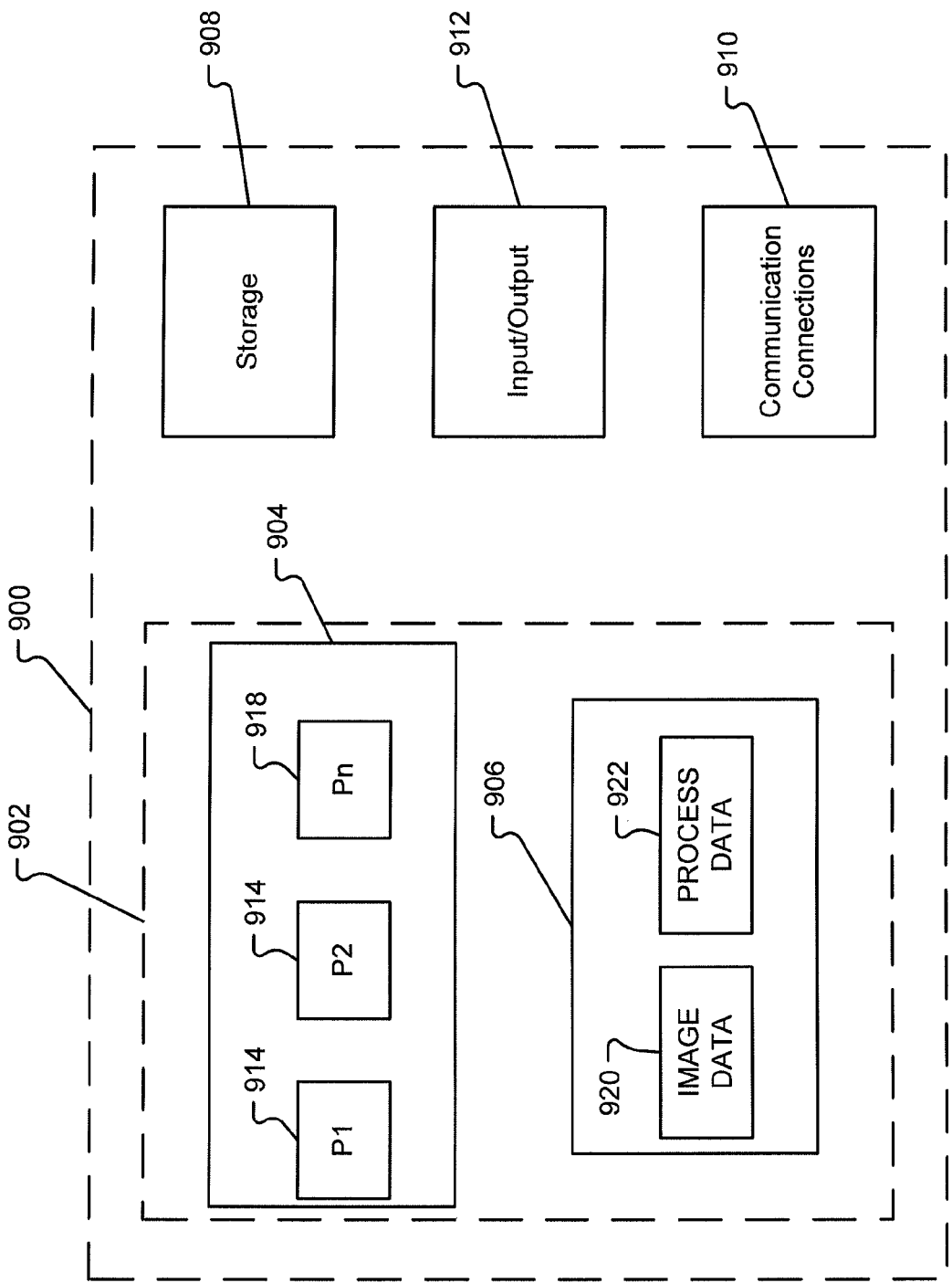
FIG. 9 is a functional diagram illustrating a computer environment and computer system 900 operable to execute embodiments of the present disclosure.

With reference to FIG. 9, an embodiment of a computing environment for implementing the various embodiments described herein includes a computer system, such as computer system 900. Any and all components of the described embodiments may execute on a client computer system, a server computer system, a combination of client and server computer systems, a handheld device, and other possible computing environments or systems described herein. As such, a basic computer system applicable to all these environments is described hereinafter.

In its most basic configuration, computer system 900 comprises at least one processing unit or processor 904 and system memory 906. The most basic configuration of the computer system 900 is illustrated in FIG. 9 by dashed line 902. In some embodiments, one or more components of the described system are loaded into system memory 906 and executed by the processing unit 904 from system memory 906. Depending on the exact configuration and type of computer system 900, system memory 906 may be volatile (such as RAM), non-volatile (such as ROM, flash memory, etc.), or some combination of the two.

Additionally, computer system 900 may also have additional features/functionality. For example, computer system 900 includes additional storage media 908, such as removable and/or non-removable storage, including, but not limited to, magnetic or optical disks or tape. In some embodiments, software or executable code and any data used for the described system is permanently stored in storage media 908. Storage media 908 includes volatile and non-volatile, removable and non-removable media implemented in any method or technology for storage of information such as computer readable instructions, data structures, program modules, or other data. In embodiments, images, such as mammogram images, and/or the various image recognition processes and voting processes are stored in storage media 908.

System memory 906 and storage media 908 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information and which is accessed by computer system 900 and processor group 904. Any such computer storage media may be part of computer system 900. In some embodiments, images, such as mammogram images, the various image recognition processes and voting processes, and/or the results generated by the various processes, systems, and methods are stored in system memory 906. In embodiments, system memory 906 and/or storage media 908 stores data used to perform the methods or form the system(s) disclosed herein, such as image data, mathematical formulas, image recognition processes, voting processes, etc. In embodiments, system memory 906 would store information such as image data 920 and process data 922. In embodiments, image data 920 may contain actual representations of an image, such as a mammogram image 100 (FIG. 1). Application data 916, in embodiments, stores the procedures necessary to perform the disclosed methods and systems. For example, application data 922 may include functions or processes for image recognition or voting, functions or processes for displaying the identified areas of interest, etc.

Computer system 900 may also contain a processor, such as processor P1 914. Processor group 904 is operable to perform the operations necessary to perform the methods disclosed herein. For example, processor group 904 may perform the operations of the various image recognition processes and voting processes. In one embodiment, processor group 904 may comprise a single processor, such as processor P1 914. In other embodiments, processor group 904 may comprise multiple processors, such as processors P1 914, P2 916, and Pn 918, such as in a multiprocessor system. One of skill in the art will recognize that any number of processor may comprise processor group 904. In embodiments utilizing a multiprocessor environment, each processor of the multiprocessor environment may be dedicated to process the computations of a specific image recognition process. In such an embodiment, image recognition processes may be performed in parallel, leading to an efficient distribution of processing power as well as an increase in processing time for the various systems and methods disclosed herein. In further multiprocessor embodiments, specific processors may be dedicated to process the computations involved in the various comparisons and voting processes. In yet another embodiment, similar tasks performed by different image recognition processes can be grouped together and processed by a processor dedicated to processing such a task. One skilled in the art will appreciate that any method, process, operation, or procedure disclosed herein may be individually processed by a dedicated processor.

Computer system 900 may also contain communications connection(s) 910 that allow the device to communicate with other devices. Communication connection(s) 910 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, mammogram images and or determinations of probability results may be transmitted over communications connection(s) 910.

In embodiments, communications connection(s) 910 may allow communication with other systems containing processors. In such an embodiment, a distributed network may be created upon which the disclosed methods and processes may be employed. For example, image recognition processes may be divided along the distributed network such that each node, computer, or processor located on the network may be dedicated to process the calculations for a single image recognition process. In such an embodiment, image recognition processes may be performed in parallel, leading to an efficient distribution of processing power as well as an increase in processing time for the various systems and methods disclosed herein. In further distributed network embodiments, specific computers, nodes, or processors located on the network may be dedicated to process the computations involved in the various comparisons and voting processes disclosed herein. One skilled in the art will appreciate that any method, process, operation, or procedure disclosed herein may be individually processed by a dedicated computer, node, or processor in a distributed network.

In some embodiments, computer system 900 also includes input and output connections 912, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 912 are used to display the information as described herein. All these devices are well known in the art and need not be discussed at length here.

In some embodiments, the component described herein comprise such modules or instructions executable by computer system 900 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 900 is part of a network that stores data in remote storage media for use by the computer system 900.

An illustration of an embodiment of the method and system at work will aid in fully understanding an embodiment of the present disclosure. The following description is intended to provide an example of an embodiment of the disclosure and not to limit the disclosure in any way. An application residing on a computer system, such as computer system 900 is used to analyze mammogram images to identify areas of interest on the image. In embodiments, areas of interest may be portions of the image displaying instances of cancer, lesions, calcifications, tumors, cysts, or other ailments. An image, such as a mammogram image 100 is inputted into the application. In embodiments, the application then applies a plurality of image recognition processes to analyze the image. One of skill in the art will appreciate that the number of image recognition processes applied to the image is irrelevant so long as at least one unique image recognition process is applied. Each image recognition process applied may identify areas of interest on the mammogram image independently, e.g., without sharing information with other image recognition processes or based solely upon the determinations of an individual image recognition process. In other embodiments, the image recognition processes may work together to identify different areas of interest. In embodiments, each image recognition process is processed by a dedicated processor in a multiprocessor system or over a distributed network, thereby allowing the image recognition processes to be processed in parallel, thus increasing computational efficiency and spreading the workload across multiple processors.

In embodiments, after the image recognition processes individually identify areas of interest or objects on the mammogram image, the different identified areas of interest or objects are compared to determine a confidence value related to the accuracy of the identifications. In embodiments, the comparison is done using a voting process. Comparing the results of multiple image recognition processes allows for the mitigation of the inherent faults of the image recognition process, thus leading to reduced false positive and false negative rates. Additionally, methods utilizing multiple image recognition processes, rather than a single one, amicably lend themselves to multiple processor systems or networks. On the other hand, developing a more complicated image recognition process does not necessarily ensure that the image recognition process is free from inherent faults, nor does a single, more complicated process lend itself to a multiprocessor system or network due to the difficulty in dividing a single process among several processors. Thus, embodiments of the disclosed methods and system(s) provided for increased accuracy and computation efficiency. While embodiments of the present disclosure have been explained in regards to analyzing a mammogram image, one of skill in the art will appreciate that any type of image may be analyzed using embodiments of the present disclosure.

In embodiments, the results of the comparison are used in determining confidence values for the areas of interest. In embodiments, indications of areas of increased interest with a confidence value over a certain threshold are displayed on the mammogram image. In other embodiments, the results of the comparison may also be used in calculating new areas of interest. In embodiments, the new areas of interest may be a combination of areas of interest identified by separate image recognition processes.

In embodiments, indications of areas of increased interest are displayed on the mammogram image, and the image is then displayed for human analysis. In embodiments, the mammogram image containing indications of areas of interest may be displayed on a computer monitor or printed in some form for human analysis. In such embodiments, the disclosed methods and system(s) may be used to aid physicians in detecting cancer. In other embodiments, the information related to the areas of interest is stored for operation by another application.

This disclosure described some embodiments of the present invention with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present invention. Therefore, the specific structure, acts, or media are disclosed only as illustrative embodiments. The invention is defined by the appended claims.

What is claimed is:

1. A computer implemented method for determining at least one confidence value for recognizing areas of interest on an image, the computer implemented method comprising:
   identifying a first identified area of interest based on output from a first image recognition process, the first identified area of interest having a first location on the image;
   identifying a second area of interest, wherein at least part of the second area of interest is different from the first identified area of interest, the second identified area of interest having a second location on the image;
   comparing the first identified area of interest on the image to the second identified area of interest on the image to calculate at least one confidence value for at least part of the at least first identified area of interest, wherein the comparison comprises a voting process that determines the confidence value based at least upon a proximity between the first location and second location; and
   providing the at least one confidence value.

2. The computer implemented method of claim 1, wherein the second area of interest is identified by output from a second image recognition process that is different from the first image recognition process.

3. The computer implemented method of claim 1, further comprising:
   selecting at least one identified area of interest based upon the at least one confidence value; and
   outputting an indication of the selected areas of interest.

4. The computer implemented method of claim 1, further comprising:
   combining the identified areas of interest to produce one or more new of areas of interest; and
   outputting an indication of the one or more new locations of areas of interest on the image.

5. The computer implemented method of claim 1, wherein the voting process further comprises:

determining a plurality of boundaries for the first and second identified areas of interest;
comparing the boundaries to determine whether the one or more of the plurality of determined boundaries intersect; and
based upon the comparison, producing the at least one confidence value.

6. The computer implemented method of claim 1, wherein the voting process further comprises:
comparing the first and second identified areas of interest to determine whether the first and second identified areas of interest overlap on the image; and
based upon the comparison, producing the at least one confidence value.

7. The computer implemented method of claim 1, wherein the voting process further comprises:
defining a relative location measure between the first and second locations;
computing the relative location measure between the first and second locations; and
based upon the computed measure, determining the at least one confidence value.

8. The computer implemented method of claim 7, wherein the each of the first and second locations comprises a focal point.

9. A computer storage media encoding a computer program of instructions for executing a computer process for a method of determining at least one confidence value for recognizing a areas of interest on an image, the method comprising:
identifying a first identified area of interest based on output from a first image recognition process on the image, the first identified area of interest having a first location on the image;
identifying a second identified area of interest based on output from a second image recognition process on the image, wherein at least part of the second identified area of interest is different from the first area of interest, the second identified area of interest having a second location on the image;
comparing the at least first identified area of interest identified on the image to the second identified area of interest identified on the image to calculate the at least one confidence value for at least part of the at least first identified area of interest, wherein the comparison comprises a voting process that determines the confidence value based at least upon a proximity between the first location and second location; and
providing the at least one confidence value.

10. The method of claim 9, wherein the first and second image recognition processes do not share information used to identify the identified areas of interest on the image.

11. The method of claim 9, further comprising:
selecting at least one identified area of interest based upon the at least one confidence value; and
outputting an indication of the selected areas of interest.

12. The method of claim 9, further comprising:
combining the identified areas of interest to produce one or more new locations of areas of interest; and
outputting an indication of the one or more new locations of areas of interest on the image.

13. The computer implemented method of claim 9, wherein the voting process further comprises:
determining a plurality of boundaries for the first and second identified areas of interest;
comparing the boundaries to determine whether the one or more of the plurality of determined boundaries intersect; and
based upon the comparison, producing the at least one confidence value.

14. The computer implemented method of claim 9, wherein the voting process further comprises:
comparing the first and second identified areas of interest to determine whether the first and second identified areas of interest overlap on the image; and
based upon the comparison, producing the at least one confidence value.

15. The computer implemented method of claim 9, wherein the voting process further comprises:
defining a relative location measure between the first and second locations;
computing the relative location measure between the first and second locations; and
based upon the computed measure, determining the at least one confidence value.

16. The computer implemented method of claim 15, wherein the each of the first and second locations comprises a focal point.

17. A computer implemented method for determining at least one confidence value for recognizing areas of interest on an image, the computer implemented method comprising:
identifying a first area of interest on the image based on output from the first image recognition process on the image, the first area of interest having a first location;
comparing the first area of interest identified on the image to output of the second image recognition process on the image, the output of the second image recognition process identifying a second area of interest having a second location, to produce at least one confidence value for at least the first area of interest and the second area of interest identified on the image, wherein the comparison comprises a voting process that determines the at least one confidence value based at least upon a proximity between the first location and the second location; and
determining one or more areas of increased interest, wherein determining the one or more areas of increased interest comprises at least one of:
a. selecting at least one of the first and second areas of interest as an area of increased interest based upon the at least one confidence value; and
b. combining the first and second identified areas of interest to produce at least one new area of increased interest; and
outputting an indication of the one or more areas of increased interest on the image.

18. The computer implemented method of claim 17, wherein voting process further comprises:
determining a first boundary for the first area of interest and a second boundary for the second area of interest;
comparing the first and second boundaries to determine whether the first and second boundaries intersect; and
based upon the comparison, producing the at least one confidence value.

19. The computer implemented method of claim 17, wherein voting process further comprises:
comparing the first area and the second area to determine whether the the first and second areas overlap on the image; and
based upon the comparison, producing the at least one confidence value.

20. The computer implemented method of claim 17, wherein voting process further comprises:
determining a first focal point for the first area of interest and a second focal point for the second area of interest;

computing the distance between the first and second focal points; and based upon the computed distance, determining the at least one confidence value.

21. A computer implemented method for determining at least one confidence value for recognizing areas of interest on single image, the computer implemented method comprising:

identifying at least a first identified area of interest having a first location on the single image based on output from a first image recognition process on the single image, the first identified area of interest having a first confidence value;

identifying a second result for the single image based on output from a second image recognition process on the single image, the second result comprising one of:

(a) no areas of interest; and (b) a second area of interest different from the first area of interest and having a second location;

comparing the first identified area of interest to the second result, wherein, when the second result comprises a second area of interest having a second location, the step of comparing comprises a voting process that determines the confidence value based at least upon a proximity between the first location and the second location; and adjusting the first confidence value based on the comparison of the first area of interest to the second result.

* * * * *